April 18, 1961  C. O. TELFORD  2,979,851
CONTROLLED DEPTH TROLLING DEVICE
Filed April 4, 1960  2 Sheets-Sheet 1
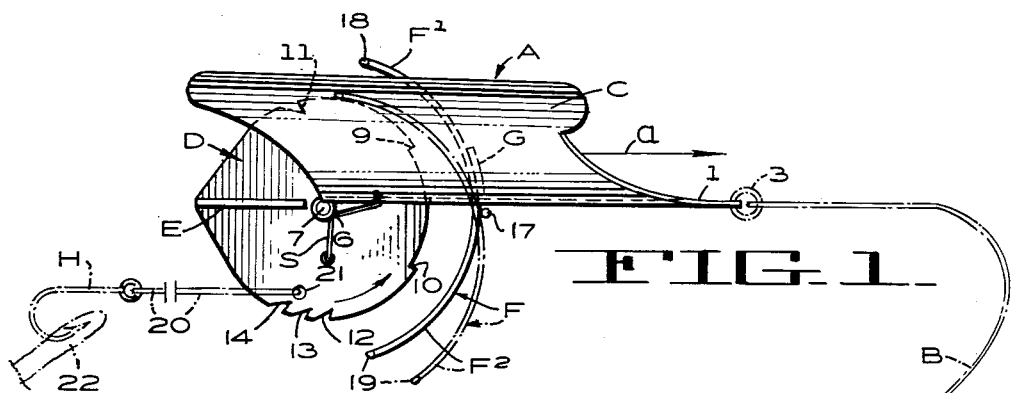
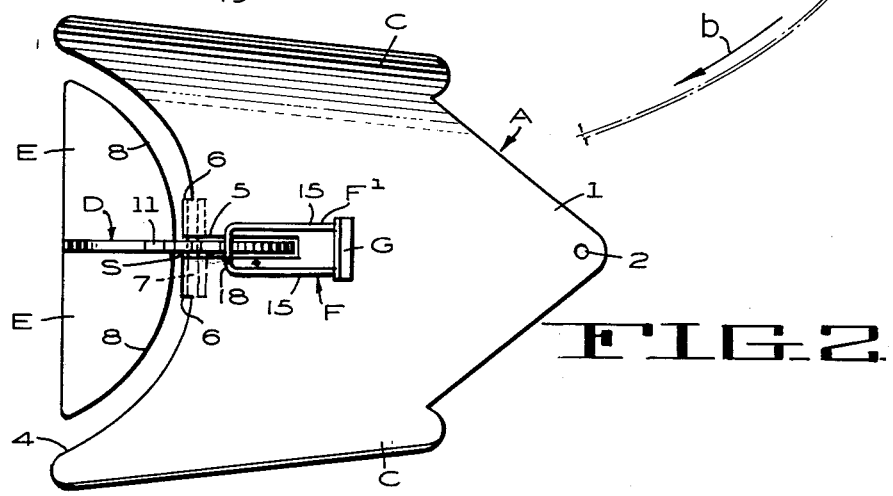
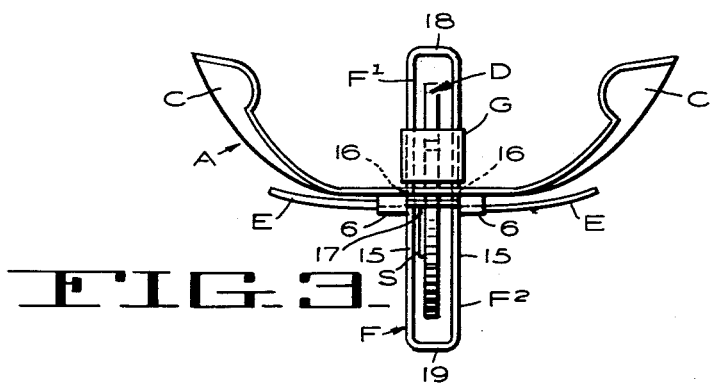
INVENTOR.
CARLYLE O. TELFORD
BY
Munn & Liddy
ATTORNEYS

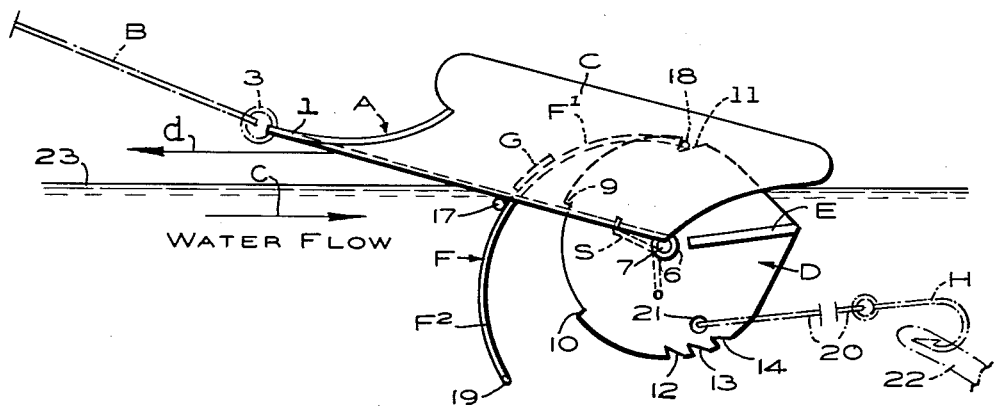
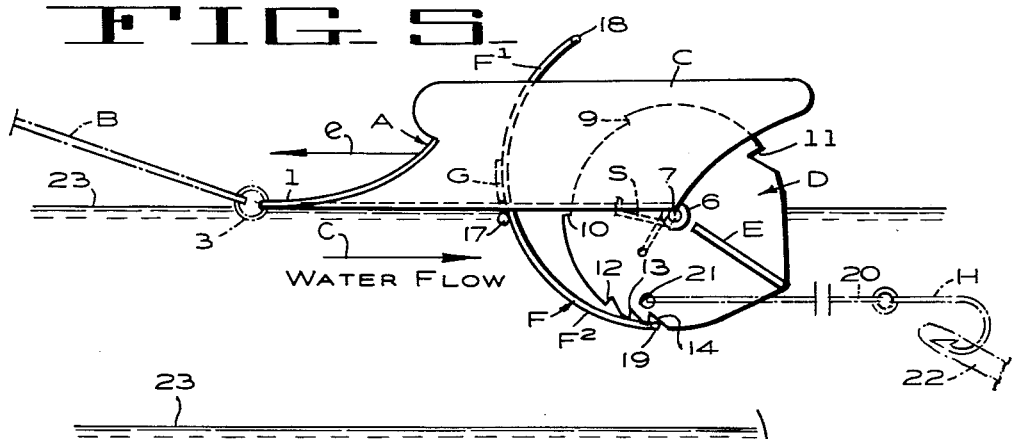
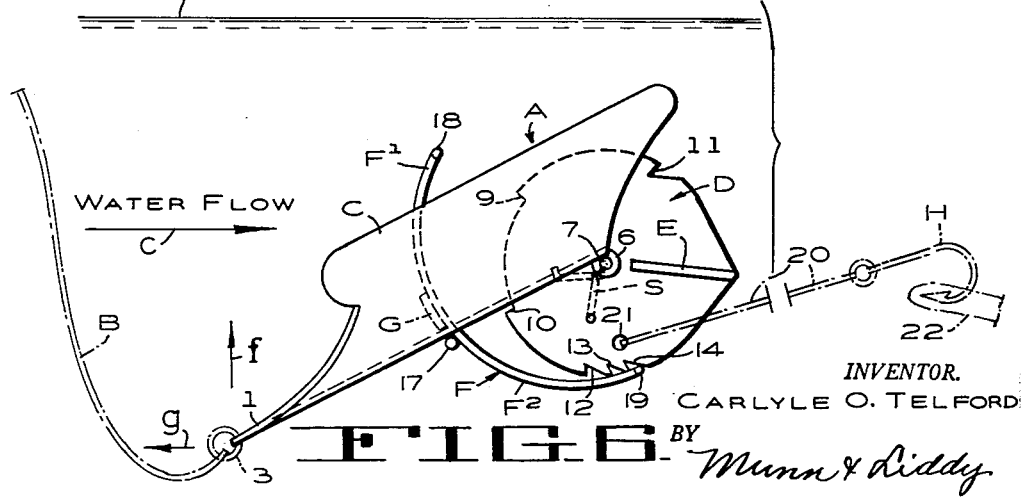

2,979,851
CONTROLLED DEPTH TROLLING DEVICE

Carlyle O. Telford, 24867 Joanne St., Hayward, Calif.

Filed Apr. 4, 1960, Ser. No. 19,829

3 Claims. (Cl. 43—43.13)

The present invention relates to improvements in a controlled depth trolling device, and it consists in the combinations, constructions and arrangements hereinafter described and claimed.

An object of my invention is to provide a controlled depth trolling device that can be attached to a fish line and in turn have the fish line attached to it so as to maintain the lure at a definite predetermined depth in the water. The device is designed to be used when fishing in a flowing stream or where the fisherman is fishing from a moving boat.

Novel means is provided for causing the device to submerge to a desired level in the water when the fisherman merely increases the tension on the fish line for a moment and then relaxes the tension for a moment after which he again applies the usual line tension. The submerging of the device will cause the fish lure, attached to the device, to move downwardly in the water to a desired depth. This novel means can again be actuated by momentarily slackening the fish line and then again pulling on the line for causing the means to raise the device to the surface of the body of water. It is possible to raise or lower the device in the water in this manner without the necessity of hauling it out of the water each time a depth adjustment is to be made or when the fisherman wishes to inspect the device.

A further object of my invention is to provide a device of the type described which is simple in construction and is durable and efficient for the purpose intended.

Other objects and advantages will appear in the following specification and the novel features will be pointed out in the appended claims.

Drawings

For a better understanding of the invention, reference should be had to the accompanying drawings, forming a part of this specification, in which—

Figure 1 is a side elevation of the controlled depth-trolling device;

Figure 2 is a top plan view of Figure 1;

Figure 3 is a front elevation of Figure 2;

Figure 4 shows the device when it is moving on the surface of the water;

Figure 5 shows the device preparatory to diving to a predetermined depth below the surface of the water; and Figure 6 shows the device below the water surface.

While I have shown only the preferred form of my invention, it should be understood that various changes or modifications may be made within the scope of the annexed claims without departing from the spirit thereof.

Detailed description

In carrying out my invention, I provide a controlled depth trolling device which comprises a body member A, which is preferably made from sheet metal although I do not want to be confined to any particular material. The body member can skim over the top of a water surface in a manner to be described hereinafter and it therefore has a prow-shaped forward end 1 with an opening 2 at its front to which a fish line B may be attached by a ring 3 or other suitable fastening means.

A front view of the body A, is shown in Figure 3, and it will be seen that the sides of the body are curved upwardly to provide stabilizing wings C—C. The wings will cause the device to right itself automatically when the device is thrown out upon the surface of the water during casting. In case the device should strike the water with one wing C hitting the water surface before the other, the curvature of the wing and the weight of the central portion of the body A will cause the device to right itself and it will ride on the water surface and assume the position shown in Figure 3. It should also be noted that as the device is thrown through the air during casting, the curvature of the wings will cause it to strike the water right side up.

The rear of the body A has an arcuate recess 4, see Figure 2, and the central portion of the body has a rearwardly facing elongated slot 5 that opens into the recess 4 at the center portion thereof. The length of the slot 5 extends in the direction of the length of the body A. A rocker disk D has its forward portion rotatably received in the slot 5. The body A has tongues formed into bearings 6—6 that receive the ends of a shaft 7, which in turn passes through the center of the disc D, and supports it. The portion of the disc D, that extends below the underside of the body A, acts as a rudder for the device to keep it lined up properly with the fish line B.

On each side of the disc D, and at the rear half thereof, I mount two laterally extending flaps E, whose front edges 8—8 are curved in the same manner as the curvature of the recess 4 in the body A. The flaps E extend radially from the shaft 7 see Figure 1, so that in one position of the rocker disc D, they can lie in the same plane as the central longitudinal portion of the body A. The rotation of the rocker disc D is limited between its two extreme positons shown in Figures 4 and 5. When the rocker disc D is rotated to incline the flaps E—E upwardly with respect to the central longitudinal portion of the body A, the stop 9 on the disc will come into contact with the upper surface of the adjacent portion of the body A, see Figure 4, and will prevent any further swinging of the rocker disc in the same direction. When the rocker disc D is rotated to incline the flaps E—E downwardly into the position shown in Figure 5, the flaps making an obtuse angle with respect to the central longitudinal portion of the body A, the stop 10, on the disc will come into contact with the under surface of the adjacent portion of the body A, and will prevent any further swinging of the rocker disc in the same direction.

The rocker disc D has one notch or ratchet tooth 11 formed in the upper arcuate edge of the disc; and it has a plurality of notches or ratchet teeth 12, 13 and 14 formed in the lower arcuate edge of the disc. A lock wire F, in the form of a rectangular loop, see Figure 3, has its two elongated sides 15—15 passed through two openings 16—16 provided in the body A. A cross bar 17 has its ends welded to the sides 15—15, and the cross bar is disposed directly below the undersurface of the body A, see Figure 1. A resistance plate G also extends between the sides 15—15 of the lock wire F, and is welded or otherwise secured to the sides. The resistance plate G is disposed directly above the upper surface of the body A, see Figure 3. The lock wire F is therefore free to pivot on the lower edge of the resistance plate G, as shown by the full and dot-dash lines of Figure 1.

It will also be noted from Figure 1, that both the upper arm $F^1$ and the lower arm $F^2$ curve away to the left from the cross bar 17, and will have a tendency to swing counter-clockwise from the full to the dot-dash line position, due to gravity. The purpose of this will be explained shortly. The upper arm F¹ has its two sides 15—15 interconnected by a top cross piece 18 that is adapted to enter the notch or ratchet tooth 11 and prevent a clockwise rotation of the rocker disc D, in Figure 4, when the flaps E—E extend at an upward angle to the central longitudinal portion of the body A. In like manner, the lower arm F² has its two sides 15—15 interconnected by a cross piece 19, that is adapted to enter any desired one of the notches or ratchet teeth 12, 13 and 14 and prevent a counterclockwise rotation of the rocker disc D, in Figure 5, when the flaps E—E extend at a desired downward angle to the central longitudinal portion of the body A.

A leader line 20 has one end passed through an opening 21, provided in the lower half of the rocker disc D, and the other end of the line is connected to a lure (not shown) that carries fish hooks, or the line is connected to a fish hook H, which in turn may carry fish bait 22. The pull on the fish line B will pull on the leader line 20 and tend to rotate the rocker disc D clockwise when looking at Figure 1.

Operation

From the foregoing description of the various parts of the device, the operation thereof will be readily understood.

Figure 1 indicates by the arrow $a$, how the device is thrown through the air with the lure or bait 22 attached thereto, during the casting of the device by the fisherman preparatory to trolling. Arrow $b$, in the same figure, shows the initial direction of the fish line B, as it extends from the device, which is moving through the air, and back to the fishing rod, not shown, that is held by the fisherman. The device will reverse its position when it reaches the end of the cast and this new position is indicated in Figure 4.

During the movement of the device through the air in the act of casting, the lure or bait 22 will tend to drag and will pull on the lead line 20 and will rotate the rocker disc D on its shaft 7 in a clockwise direction when looking at Figure 1. A torsional spring S is mounted on the shaft 7 and has one end connected to the body A and the other end connected to the disc D. The spring S tends to rotate the disc D in a clockwise direction when looking at Figure 4. The stop 9, on the disc D, will strike the body A, and prevent the disc from rotating counterclockwise when looking at Figure 4, beyond a certain point. The notch or tooth 11 will be brought into registration with the top cross piece 18 of the lock wire F, when the disc D has been rotated counterclockwise when the hook H and bait 22 exerts a pull on the leader 20 to overcome the spring S. It will be seen from Figure 1 that both ends of the arms of the lock wire F are disposed to the left of the resistance plate G and the lock wire F will rock on the lower edge of the plate G as a fulcrum. The rotative movement of the lock wire F will be counterclockwise due to gravity tending to swing the two arms F¹ and F² downwardly. The lock wire F will therefore be swung by gravity from the full line to the dot-dash line position in Figure 1, and when the rocker disc D has been rotated to bring the upper notch 11 into registration with the top cross piece 18, this cross piece will drop into the notch and hold the disc D in this position. When the fisherman pulls on the line at the end of his cast, the hook H and bait 22 will cause the leader line 20 to pull on the lower part of the disc D to overcome the force of the torsional spring S, and cause the disc to rotate counterclockwise and the cross piece 18 to drop into the notch 11.

Figure 4 illustrates the position of the flaps E and the position of the lock wire F, when the device strikes the water surface 23 at the end of the casting stroke by the fisherman. The flow of water relative to the device will be in the direction indicated by the arrow $c$ in Figure 4. Tension will therefore be created on the fish line B, in order to stop the device from moving in the direction of the arrow $c$. The flaps E will be inclined upwardly with respect to the length of the midportion of the body A, and this will keep the device riding on the surface 23 of the water as clearly shown in Figure 4. The forward pull on the device by the fish line B is shown by the arrow $d$.

Assume that the fisherman would like the device to dive below the water surface 23 and place the device and lure or bait 22 at a desired depth in the water. The fisherman momentarily gives a quick pull on the line B, and this will increase the pressure of the water against the submerged arm F² of the lock wire F to free the upper arm F¹ from the notch 11 in the rocker disc D and swing the submerged arm F², so that its lower cross piece 19 will bear against the periphery of the disc. At the same time, the pull on the line B will cause the hook H to pull on the disc D and rotate the disc counterclockwise a slight distance in Figure 4 to free the notch 11 from the cross piece 18. The stop 9 is spaced a slight distance above the body A, to permit this movement and the release of the cross piece 18. As soon as the notch 11 in the rocker disc D is freed from the upper cross piece 18, the flaps E will move into a plane paralleling the flow of water.

The fisherman now momentarily plays some slack into the line B, and this permits the device to rest on the water surface 23, see Figure 5, rather than be inclined upwardly as shown in Figure 4. The torsional spring S will rotate the rocker disc D clockwise in Figure 5, into the position shown and the water pressure against the easily rotated submerged arm F² will move the lower cross piece 19 into the notch or tooth 14. The fisherman can become expert in exerting the proper tension on the line in order to permit the spring S to rotate the disc D, and bring the desired one of the notches 12, 13 or 14 into registry to receive the lower cross piece 19. The stop 10, on the disc D, will prevent the disc from rotating clockwise beyond the position shown in Figure 5.

As soon as the cross piece 19 has been received in the desired notch 12, 13 or 14 the fisherman pulls on the line B, and this will move the device forward in the direction of the arrow $e$ in Figure 5, and the water flow $c$ in the same figure, will strike the submerged arm F², and will cause the lower cross piece to engage with the desired notch, such as the notch 14, in Figure 5. The rocker disc D is now locked with the flaps E extending downwardly and making an obtuse angle with the length of the central portion of the body A. A continued pull on the line B will cause the flaps E, to make the body A dive below the water surface 23, as the water strikes the flaps, and the downward movement will continue until the upward angular pull of the line on the device will equal the downward angular movement of the device into the water. When the notch 14 is engaged by the lower cross piece 19, the device will submerge to its greatest depth. A lesser depth will be established when the lower cross piece 19 is received in the notch 13, and a still lesser depth will be established when the lower cross piece 19 is received in the notch 12.

It is possible for the fisherman to bring the device back up to the water surface 23, without the necessity of winding up the line B, and pulling the device back to where the fisherman can reset the device and again cast it onto the water. To cause the device to surface, the fisherman relaxes the pull on the line B, see Figure 6. This will relax the pull of the lead line 20 on the rocker disc D, and permit the spring S to rock the disc D slightly in a clockwise rotation to free the cross piece 19 from the recess 14. The fisherman now pulls on the line B, and this will cause the lead line 20 to pull on the lower portion of the disc D, and rotate it in a counterclockwise direction and overcome the force of the spring S. The flaps E will swing upwardly about the shaft 7. It should be noted that until the line B is relaxed and the lead line 20 ceases to pull on the rocker disc D, the ratchet tooth 14 will keep the lower cross piece 19 in contact there-with even though there is a force of water directed against the resistance plate G due to the forward movement of the device in the water.

When once the fisherman relaxes the tension on the line B, the lock wire F will swing clear of the ratchet tooth 14. Then when the fisherman pulls on the line B, the drag of the leader line 20 on the lower disc portion will rotate the disc against the force of the spring and bring the notch 11 into registry with the cross piece 18. The force of the water on the plate G will swing the lock wire F to cause the cross piece 18 to enter the notch 11. The rotation of the disc D counterclockwise will swing the flaps E so that they extend upwardly at an angle to the top surface of the body A. Further pulling on the line B will cause the water to strike the flaps E, and cause the device to surface and to assume the position again at the surface 23 of the water as clearly shown in Figure 4. It is possible for the fisherman to cause the device to avoid hitting a submerged rock and to move upwardly in the water to the surface. It is also possible for the fisherman to examine the device and the lure or bait 22 in this manner while the device is still in the water and thus do away with the necessity of reeling all of the line in and winding it on the reel.

The device can be again forced downwardly to a desired depth below the water surface 23, by repeating the operations already described. The device will remain in a downwardly inclined position, as shown in Figure 6, even when reaching the predetermined depth position in the water. This is true because the line B will be exerting an upward and forward pull on the body A at the front of the body and this pull will be the resultant force caused by a vertical lift component force indicated by the arrow $f$ in Figure 6, and a horizontal moving force indicated by the arrow $g$ in the same figure. The upwardly inclined pulling force which tends to raise the device in the water is balanced by a second force exerted by the water which is directed against the downwardly inclined flaps E, and tends to move the device to a greater depth in the water. Since the two forces balance each other, the device will move along at the predetermined depth below the water surface 23.

I claim:

1. A controlled depth trolling device comprising a body member having two laterally extending and upwardly curved wings; a combined rocker disc and rudder carried by the body and rotatable about an axis that extends at right angles to the longitudinal axis of the body; said body having a slot for receiving the forward portion of the disc; laterally extending flaps carried by the disc and projecting from both sides thereof; the disc being rotatable for swinging the flaps from a plane substantially coinciding with the plane of the longitudinal central portion of the body into angular positions where the flaps will be inclined downwardly or upwardly with respect to the said central body portion; stops carried by the disc and engageable with the body for limiting the extreme angular positions of the flaps; said disc having a tooth in the portion of the periphery disposed above the upper surface of the body and having a set of teeth in the periphery portion disposed below the lower surface of the body; a lock wire pivotally carried by the body and having an upper and a lower cross piece; the lock wire being swingable in one direction for causing the upper cross wire to engage with the first-mentioned tooth for holding the flaps in a certain upwardly and rearwardly inclined position with respect to the central body portion and being swingable in the opposite direction for causing the lower cross wire to engage with a desired tooth in the lower set of teeth for holding the flaps in a certain downwardly and rearwardly inclined position with respect to the central body portion; the front of the central body portion having a fish line attached thereto, and the lower portion of the disc having a hook-carrying line attached thereto.

2. The combination as set forth in claim 1: and in which the lock wire has a resistance plate disposed near the upper cross piece and extending at right angles to the longitudinal axis of the body; said resistance plate being moved by the water flow when the device is submerged for swinging the upper cross piece into engagement with the tooth on the upper portion of the disc.

3. The combination as set forth in claim 1: and spring means for tending to rotate the disc for swinging the flaps into a downwardly and rearwardly inclined angle with respect to the longitudinal axis of the body.

References Cited in the file of this patent

UNITED STATES PATENTS

| | | |
|---|---|---|
| 2,753,648 | Paterno | July 10, 1956 |
| 2,776,517 | Borgstrom | Jan. 8, 1957 |
| 2,789,386 | Creelman | Apr. 23, 1957 |